US007203206B2

(12) United States Patent
Amidan et al.

(10) Patent No.: US 7,203,206 B2
(45) Date of Patent: Apr. 10, 2007

(54) DATA PARTITIONING FOR MULTI-LINK TRANSMISSION (75) Inventors: Moran Amidan, Yehud (IL); Liron Frenkel, Netanya (IL); Haim Yanko, Moshav Misgav Dov. (IL)

(73) Assignee: Tioga Technologies Inc., San Jose, CA (US)

( * ) Notice: Subject to any disclaimer, the term of this patent is extended or adjusted under 35 U.S.C. 154(b) by 1066 days.

(21) Appl. No.: 10/067,098

(22) Filed: Feb. 4, 2002

(65) Prior Publication Data
US 2002/0181458 A1 Dec. 5, 2002

Related U.S. Application Data (60) Provisional application No. 60/345,492, filed on Jan. 3, 2002, provisional application No. 60/340,283, filed on Dec. 14, 2001, provisional application No. 60/337,038, filed on Nov. 7, 2001, provisional application No. 60/266,802, filed on Feb. 6, 2001.

(51) Int. Cl.
H04J 3/24 (2006.01)

(52) U.S. Cl. .................. 370/474; 370/535; 370/536; 370/542; 370/537; 370/473

(58) Field of Classification Search ........ 370/468–474, 370/395.6–395.65, 535–544
See application file for complete search history.

(56) References Cited

U.S. PATENT DOCUMENTS 4,727,536 A 2/1988 Reeves et al.
4,860,283 A 8/1989 Takano et al.
5,212,687 A 5/1993 De La Bourdonnaye
5,420,888 A 5/1995 Davis et al.
5,835,536 A * 11/1998 May et al. ................... 375/260
5,999,355 A 12/1999 Behrens et al.
6,061,410 A 5/2000 Linz
6,128,348 A * 10/2000 Kao et al. .................... 375/260
6,141,372 A 10/2000 Chalmers
6,222,858 B1 4/2001 Counterman
6,240,132 B1 5/2001 Yedid
6,266,348 B1 * 7/2001 Gross et al. ................. 370/493

(Continued)

FOREIGN PATENT DOCUMENTS

WO    WO 99/39468    8/1999

(Continued)

OTHER PUBLICATIONS

AF-PHY-0086.001, Promulgated by the ATM Forum, 1999, entitled: :Inverse Multiplexing for ATM (IMA) Specification Version 1.1.

(Continued)

*Primary Examiner*—Doris H. To
*Assistant Examiner*—Thai Hoang
(74) *Attorney, Agent, or Firm*—Ladas & Parry LLP (57) ABSTRACT A method for transmitting a stream of data over a channel made up of a plurality of subchannels having respective subchannel rates. The method includes partitioning the data among the subchannels, such that successive words of the data are mapped to the subchannels in alternation responsive to the respective subchannel rates. The words of the data are transmitted over the subchannels to which they are mapped, and are then received and processed to recover the stream of data.

45 Claims, 6 Drawing Sheets

U.S. PATENT DOCUMENTS

| | | | |
|---|---|---|---|
| 6,266,395 B1* | 7/2001 | Liu et al. | 379/27.01 |
| 6,445,773 B1* | 9/2002 | Liang et al. | 379/1.04 |
| 6,480,477 B1 | 11/2002 | Treadaway et al. | |
| 6,496,540 B1 | 12/2002 | Widmer | |
| 6,504,869 B2 | 1/2003 | Yedid | |
| 6,704,324 B1 | 3/2004 | Holmquist | |
| 6,778,495 B1* | 8/2004 | Blair | 370/230 |
| 2002/0031197 A1 | 3/2002 | Yedid | |
| 2002/0110187 A1 | 8/2002 | May | |
| 2002/0110210 A1 | 8/2002 | May et al. | |
| 2002/0110213 A1 | 8/2002 | May et al. | |
| 2003/0152112 A1 | 8/2003 | Almog et al. | |

FOREIGN PATENT DOCUMENTS

| | | |
|---|---|---|
| WO | WO 03/032555 | 4/2003 |

OTHER PUBLICATIONS

Standard TS 101 270-2 V1.1.3 (Sep. 2000) of the Transmission and Multiplexing™ Techn ical Committee of the European Telecommunications Standards Institute )ETSI(, entitled: "Access Transmission Systems on Metallic Access Cables; Very High Speed Digital Subscriber Line (VDSL(".

ETSI Standard TS 101 524 V1.1.2 (Aug. 2001), entitled: "Transmission and Multiplexing™; Access Transmission Systems on Metallic Access Cables; Symmetrical Single Pair High Bitrate Digital Subscriber Line (SDSL(".

Leshem, "Multichannel SDSL Optional Mode", Published as ETSI document TM6 WD19, Stockholm, Sweden, Sep. 2001.

Volkening, et al., "IMA Support in SDSL Access Environment", Published as ETSI document TM6 TD 39, Stockholm, Sweden, Sep. 2001.

Leshem, "Constellations and Framing in two Pairs SDSL", Published as ETSI document TM6 TD 58, Stockholm, Sweden, Sep. 2001.

Standard TS 101 270-1 V1.1.5 (Jun. 1999), entitled: "Transmission and Multiplexing™; Access Transmission Systems on Metallic Access Cables; Very High Speed Digital Subscriber Line (VDSL(; Part 1: Functional Requirement".

* cited by examiner

DATA PARTITIONING FOR MULTI-LINK TRANSMISSION

CROSS-REFERENCE TO RELATED APPLICATIONS

This application claims the benefit of U.S. Provisional Application(s) No(s).: 60/266,802, filed Feb. 6, 2001, 60/337,038, filed Nov. 7, 2001, 60/340,283, filed Dec. 14, 2001, and 60/345,492, filed Jan. 3, 2002, and incorporates the same by reference.

FIELD OF THE INVENTION

The present invention relates generally to digital communication systems, and specifically to methods and devices for efficiently partitioning a data stream for transmission over multiple subchannels.

BACKGROUND OF THE INVENTION

In multi-link transmission, a single data stream is partitioned over a number of parallel links between a transmitter and a receiver. In Asynchronous Transfer Mode (ATM) networks, for example, a multi-link transmission technique known as inverse multiplexing is used. This technique is described in document AF-PHY-0086.001, promulgated by the ATM Forum (1999), entitled "Inverse Multiplexing for ATM (IMA) Specification Version 1.1," which is incorporated herein by reference. IMA allows data to be transferred to and from one virtual ATM port by multiplexing over a number of parallel physical, point-to-point lines, such as E1 (2.048 Mbps) or T1 (1.544 Mbps) lines. Up to 32 such lines may be used, as stated in the IMA standard, although it is generally economical to use no more than eight lines, with the actual number of lines depending on the required bandwidth. IMA is typically used to serve sites for which a single E1 or T1 line does not give sufficient bandwidth, while a high-rate interface is not needed or economically justified.

Multi-link methods are also known in the Digital Subscriber Line (DSL) field. DSL is a modem technology that enables broadband digital data to be transmitted over twisted-pair wire, which is the type of infrastructure that links most home and small business subscribers to their telephone service providers. DSL modems enable users to access high-speed digital networks, such as ATM and Internet Protocol (IP) networks, without requiring major investments in new infrastructure. A range of DSL standards have been defined, known generically as "xDSL," wherein the various standards have different data rates and other associated features but share common principles of operation.

Very high speed DSL (VDSL) access transmission systems, for example, are described in standard TS 101 270-2 V1.1.3 (2000-09) of the Transmission and Multiplexing (TM) Technical Committee of the European Telecommunications Standards Institute (ETSI), entitled "Access Transmission Systems on Metallic Access Cables; Very High Speed Digital Subscriber Line (VDSL)," which is incorporated herein by reference. According to this standard (section 5.4), VDSL transceivers can be configured to carry two parallel subchannels over the same wire pair. Each subchannel corresponds to a different band of frequencies. In current VDSL modems, the data rates of the two channels are both integer multiples of a basic symbol rate BSR, i.e., the data rate of one channel is R1=N1*BSR, and that of the other channel is R2=N2*BSR, so that the ratio of the data rates between the two subchannels is N1:N2. In a multi-band configuration, data should clearly be split between the two channels in this same ratio in order to use the channel resources efficiently.

In the approach currently defined by VDSL standards, the N1:N2 ratio between the channels is maintained by alternately routing N1 bytes for transmission on channel 1, and then routing N2 bytes for transmission on channel 2. This approach has some disadvantages that stem from the fact that the values of N1 and N2 can be up to several hundred. Thus, for example, 200:201 is a valid N1:N2 ratio. In this case, the data are split at the transmitter in the following way:

Forward 200 bytes to channel 1
Forward 201 bytes to channel 2
Forward 200 bytes to channel 1
Forward 201 bytes to channel 2
Forward 200 bytes to channel 1
Forward 201 bytes to channel 2
...

It can be seen that this block-based splitting scheme does not give good interleaving of bytes between the two subchannels. Therefore, if one of the subchannels has a lower noise margin than the other (resulting in a higher incidence of bit errors), the result will be bursts of errors coming from this subchannel in the output data stream at the receiver. A further disadvantage of this implementation is the need for big input buffers to accumulate at least N1 and N2 bytes at both the transmitter and the receiver. The additional buffering also results in added latency.

Another type of DSL access system capable of multi-link operation is Symmetrical high-speed DSL (SDSL), as described in ETSI standard TS 101 524 V1.1.2 (2001-08), entitled "Transmission and Multiplexing (TM); Access Transmission Systems on Metallic Access Cables; Symmetrical Single Pair High Bitrate Digital Subscriber Line (SDSL)," which is incorporated herein by reference. SDSL can also operate in a four-wire mode, in which the transmitter and receiver are connected by two pairs of wires. This implementation is described by Leshem in "Multichannel SDSL Optional Mode," published as ETSI document TM6 WD19 (Stockholm, Sweden, September, 2001) which is incorporated herein by reference. For pairs 1 and 2 having respective rates $R_1$ and $R_2$, Leshem proposes that the first $L_1$ bytes in each block be allocated to pair 1, and the remaining $L_2$ bytes be allocated to pair 2, wherein $L_1/L_2=R_1/R_2$.

A number of proposals have been made for improving the transport of data streams over multi-link SDSL connections. For example, Volkening et al. suggest that IMA be used for carrying ATM streams over SDSL in "IMA Support in SDSL Access Environment," published as ETSI document TM6 TD 39 (Stockholm, Sweden, September, 2001), which is incorporated herein by reference. This proposal is based on the SDSL four-wire mode, in which the transmitter and receiver are connected by two physical links. In the IMA mode, the transmitter multiplexes the incoming ATM cells alternately, cell by cell, over the two links. Although relatively easy to implement, this solution is limited to ATM applications and does not address the needs of other types of data streams. Furthermore, because the minimum block size for IMA is a single ATM cell (53 bytes), this approach suffers from limitations of poor interleaving and added latency in the data transport. The cells are divided equally between the two links, with no provision for possible differences in data rate due to different noise margins. Therefore, the rate of data transport is limited by the rate of the worst-case link.

Leshem suggests that multiple different constellation sizes be used for multi-pair SDSL transmission, in "Constellations and Framing in Two Pairs SDSL," published as ETSI document TM6 TD 58 (Stockholm, Sweden, September, 2001), which is incorporated herein by reference. The constellation for each pair is adapted to give higher or lower bit loading per symbol, depending on the signal conditions on that pair. In this way, the overall data carrying capacity of the multiplexed links is increased, while maintaining the same baud rate on all the links. This method adds complication, however, in the physical-layer processing of the transmitter and receiver, which must be configured to handle the variable constellations, while providing only coarse control (in 6 dB steps) of the rate selection on each channel. It also fails to solve the above-mentioned problems of poor interleaving and high latency.

SUMMARY OF THE INVENTION

It is an object of the present invention to provide improved methods and systems for multi-link communications.

It is a further object of some aspects of the present invention to provide multi-link communication systems with enhanced interleaving of data between subchannels.

It is yet a further object of some aspects of the present invention to provide multi-link communication systems that minimize data latency and buffering requirements associated with multiplexing the data over different subchannels.

In preferred embodiments of the present invention, a multi-link transmitter partitions data among two or more subchannels on a word-by-word basis. Each of the subchannels may operate at its own rate, substantially independent of the other subchannels, depending on the individual subchannel conditions. The transmitter maps each word in the data stream to one of the subchannels, depending on the subchannel rates, so that the data are distributed approximately evenly over all the subchannels. In this manner, the data are shared among the subchannels in proportion to the respective subchannel rates, making optimal use of the available bandwidth, while at the same time achieving good interleaving and minimizing latency.

The word-by-word multiplexing techniques of the present invention thus differ from multi-link schemes known in the art, which are block-based. As described in the Background of the Invention, these block-based schemes divide the data stream among the sub-channels in large units, which depend on the payload blocks, packets or cells used in higher-level data framing protocols. The words used for multiplexing by preferred embodiments of the present invention are substantially independent of higher-level protocols. Typically, these words are bytes, although other greater or smaller word sizes, down to even single bits, may be used.

There is therefore provided, in accordance with a preferred embodiment of the present invention, a method for transmitting a stream of data over a channel made up of a plurality of subchannels having respective subchannel rates, the method including:

partitioning the data among the subchannels, such that successive words of the data are mapped to the subchannels in alternation responsive to the respective subchannel rates;

transmitting the words of the data over the subchannels to which they are mapped; and receiving and processing the words from the subchannels to recover the stream of data.

Preferably, partitioning the data includes mapping bytes of the data in alternation to the subchannels.

Typically, the stream of data is divided into a sequence of data blocks, each such block including a number of the words and having a block size defined by the number of the words therein, and partitioning the data includes mapping the successive words to the subchannels in a manner substantially independent of the block size. Preferably, the data blocks belong to one of a group of block types consisting of data frames, packets and cells.

Additionally or alternatively, the method includes framing the blocks in accordance with a data framing protocol applicable to the channel prior to mapping the successive words to the subchannels, and processing the words includes reassembling the blocks. In a preferred embodiment, framing the blocks includes, for each block among at least some of the blocks, combining the data from multiple bearers in a payload of the block, and mapping the successive words includes mapping the words to the subchannels in a manner substantially independent of a partitioning of the payload among the multiple bearers. Preferably, combining the data includes altering the partitioning of the payload of the blocks, without affecting the partitioning of the data among the subchannels.

In a preferred embodiment, the plurality of subchannels include a plurality of different frequency bands carried on a common physical channel. In another preferred embodiment, each of the plurality of subchannels includes a separate group of one or more wires.

Preferably, partitioning the data includes changing the partitioning among the subchannels while transmitting the words of the data, responsive to a change in one or more of the subchannels.

Preferably, partitioning the data includes deciding, for each word among the successive words, to which of the subchannels the word should be mapped. Further preferably, deciding to which of the subchannels the word should be mapped includes assigning respective numbers of the words to the subchannels so that at any point in time while transmitting the words of the data over the subchannels, a ratio of the numbers of the words that have been assigned to each of a given pair of the subchannels is approximately equal to the ratio of the respective subchannel rates. Additionally or alternatively, deciding to which of the subchannels the word should be mapped includes assigning the words to the subchannels in an order such that the words that are mapped to each of the subchannels are distributed approximately evenly with respect to the stream of data. Further additionally or alternatively, deciding to which of the subchannels the word should be mapped includes computing in advance a table of assignment of the successive words to the subchannels, and partitioning the data includes mapping the words to the subchannels responsive to the table.

Preferably, deciding to which of the subchannels the word should be mapped includes interleaving the words among the subchannels in an order that is fully determined by the subchannel rates. Most preferably, receiving and processing the words includes determining, dependent upon the rates, an order in which to reassemble the words so as to recover the stream of data.

In a preferred embodiment, deciding to which of the subchannels the word should be mapped includes selecting one of the subchannels responsive to an accumulated value indicative of a distribution of the words among the subchannels, and updating the accumulated value responsive to the selected subchannel for use in deciding to which of the subchannels subsequent words should be mapped. Preferably, selecting one of the subchannels includes assigning a respective subchannel value to each of the subchannels in proportion to the respective subchannel rates, and updating the accumulated value includes changing the accumulated value responsive to the subchannel value assigned to the selected subchannel. Additionally or alternatively, updating the accumulated value includes computing respective accumulated values for all the subchannels, responsive to the subchannel rates and to respective numbers of the words mapped to the subchannels, and selecting one of the subchannels includes selecting the one of the subchannels whose respective accumulated value satisfies a predetermined criterion.

In a further preferred embodiment, the plurality of subchannels includes three or more subchannels, and deciding to which of the subchannels the word should be mapped includes grouping at least two of the subchannels together in a subchannel group, routing a subset of the words of the data to the subchannel group, and splitting the subset of the words among the subchannels in the subchannel group. Preferably, grouping at least two of the subchannels includes assigning the subchannels in multiple subchannel groups, and providing a hierarchy of splitters for dividing the words among the groups, wherein routing and splitting the subset of the words includes controlling the splitters so as to route and split the subset of the words.

In a preferred embodiment, transmitting the words of the data includes transmitting the data over a Digital Subscribe Line (DSL) connection.

There is also provided, in accordance with a preferred embodiment of the present invention, a method for transmitting a stream of data over a channel made up of a plurality of subchannels, the method including:

framing the data in a sequence of data blocks in accordance with a data framing protocol;

partitioning the data in each of the blocks among the subchannels, such that successive words of the data are mapped to the subchannels in alternation, in a manner substantially independent of the framing of the data blocks;

transmitting the words of the data over the subchannels to which they are mapped; and receiving and processing the words from the subchannels so as to reassemble the data blocks.

There is additionally provided, in accordance with a preferred embodiment of the present invention, apparatus for transmitting a stream of data over a channel made up of a plurality of subchannels having respective subchannel rates, the apparatus including:

a subchannel demultiplexer, which is adapted to partition the data among the subchannels by mapping successive words of the data to the subchannels in alternation responsive to the respective subchannel rates; and one or more physical layer interfaces, coupled to transmit the words of the data over the subchannels to which they are mapped, whereby a receiver is able to receive and process the words from the subchannels to recover the stream of data.

Typically, the stream of data is divided into a sequence of data blocks, each such block including a number of the words and having a block size defined by the number of the words therein, and the subchannel demultiplexer is adapted to map the successive words to the subchannels in a manner substantially independent of the block size. Preferably, the apparatus includes a protocol processor, which is adapted to frame the blocks in accordance with a data framing protocol applicable to the channel, prior to mapping the successive words to the subchannels by the subchannel demultiplexer.

There is further provided, in accordance with a preferred embodiment of the present invention, apparatus for transmitting a stream of data over a channel made up of a plurality of subchannels, the method including:

a protocol processor, which is adapted to frame the data in a sequence of data blocks;

a subchannel demultiplexer, which is adapted to partition the data among the subchannels by mapping successive words of the data to the subchannels in alternation, substantially independently of the framing of the data blocks by the protocol processor;

one or more physical layer interfaces, coupled to transmit the words of the data over the subchannels to which they are mapped, whereby a receiver is able to receive and process the words from the subchannels so as to reassemble the data blocks.

The present invention will be more fully understood from the following detailed description of the preferred embodiments thereof, taken together with the drawings in which:

DETAILED DESCRIPTION OF PREFERRED EMBODIMENTS

Figure 1:
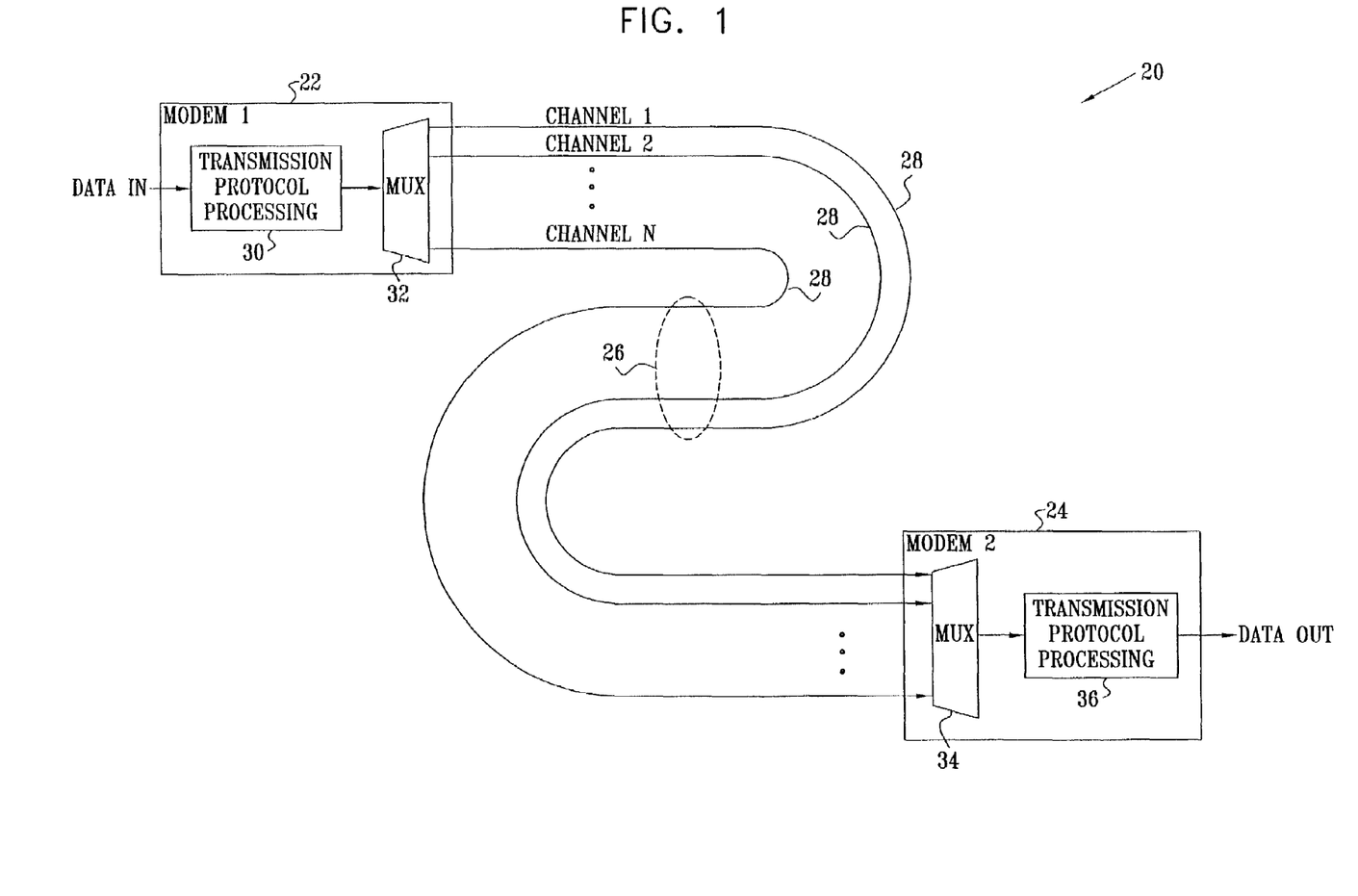
FIG. 1 is a block diagram that schematically illustrates a multi-link communication system, in accordance with a preferred embodiment of the present invention.

FIG. 1 is a block diagram that schematically illustrates a multi-link data communication system 20, in accordance with a preferred embodiment of the present invention. System 20 comprises a pair of modems, identified as a transmitter 22 and a receiver 24, which are typically (although not necessarily) DSL modems. The transmitter and receiver communicate over a channel 26, which is made up of multiple subchannels 28, labeled channel 1 through channel K. Subchannels 28 may be physically separate wires (or wire pairs), as in the SDSL four-wire mode described above. Alternatively, the subchannels may simply be different partitions on a common wire pair, occupying different time or frequency slots, as in dual-band VDSL, also described above. Typically, each subchannel has its own data rate, referred to here as R1, R2, . . . , RK, wherein for each subchannel J, the rate is given by RJ=NJ*BSR, as described above. The rates are determined by transmitter 22 and receiver 24 using rate negotiation procedures defined by the applicable standards, depending upon the individual communication characteristics of each subchannel.

A transmission protocol processing block 30 in transmitter 22 receives an input data stream and frames the data for transmission, in accordance with an applicable data transmission protocol. Such protocols are defined, for example, by the VDSL and SDSL standards cited in the Background of the Invention. Typically, block 30 adds overhead bits to the data payload. A demultiplexer 32 maps the data frames, byte by byte, to subchannels 28, depending on the subchannel rates R1, R2, ..., RK (or equivalently, the rate parameters N1, N2, ..., NK). Preferably, demultiplexer 32 adds synchronization bytes to every subchannel. A multiplexer 34 in receiver 24 reassembles the byte streams from the different subchannels into the original data frames, using the synchronization bytes to time the multiplexing properly. (The synchronization bytes may be added to every packet, or just once during modem start-up.) A further protocol processing block 36 extracts the payload data from the frames and processes the data to generate an output data stream.

The use of synchronization bytes is applicable particularly to VDSL. Alternatively, for SDSL applications, for example, demultiplexer 32 frames the data sent on each subchannel, as described below. Multiplexer 34 uses the subchannel framing in reassembling the original data frames.

Figure 2:
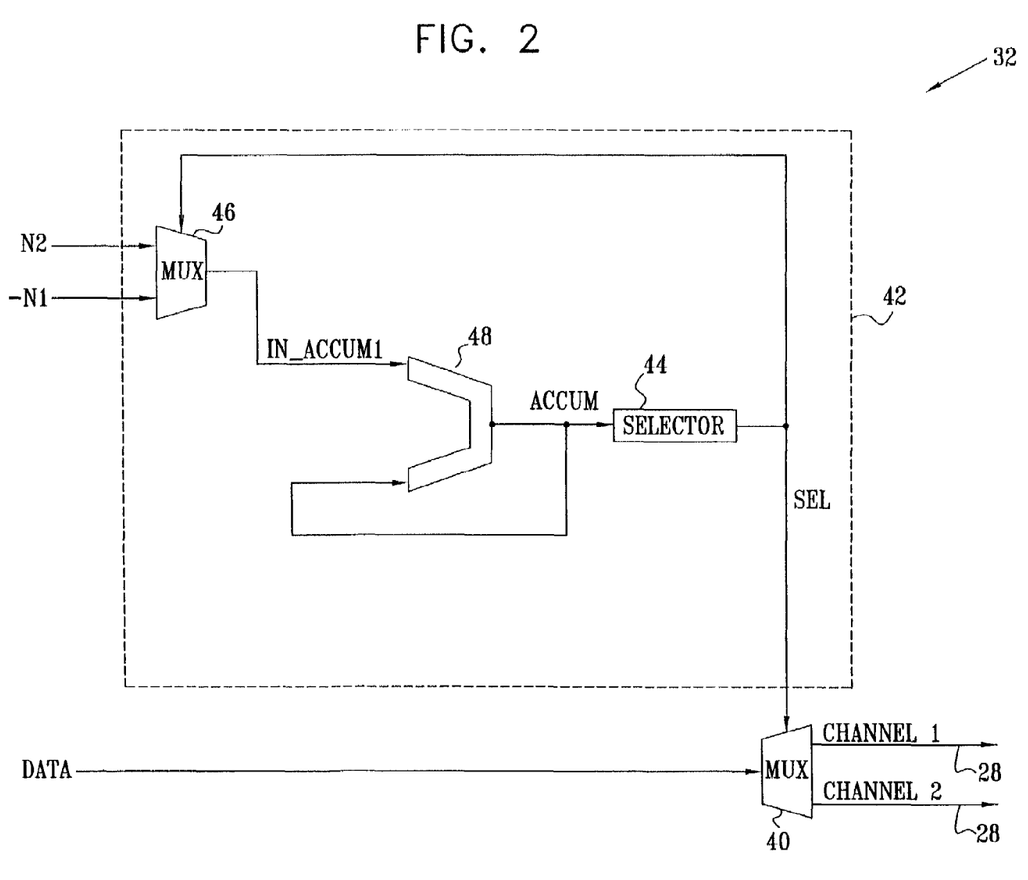
FIG. 2 is a block diagram that schematically illustrates a multiplexer used to partition a data stream among two subchannels, in accordance with a preferred embodiment of the present invention.

FIG. 2 is a block diagram that schematically shows details of demultiplexer 32, in accordance with a preferred embodiment of the present invention. In this embodiment, channel 26 includes two subchannels 28, labeled channel 1 and channel 2. A mapping multiplexer 40 receives a stream of data bytes from protocol processing block 30 and maps each byte to either channel 1 or channel 2, depending upon a select input (SEL) that it receives from selection logic 42. The selection logic drives multiplexer 40 based on integer values corresponding to the subchannel rates, N1 and N2, which it receives as input. A decision multiplexer 46 outputs a value IN_ACCUM1, which is equal to either the value N2 or the value −N1, depending on the select input SEL. IN_ACCUM1 is input to an accumulator 48, generating an output ACCUM to a selector 44. The selector determines the value of SEL to be 0 (to select the first input to each of multiplexers 40 and 46) when ACCUM>N1, or to be 1 otherwise (selecting the second input to the multiplexers).

The operation of selection logic 42 is summarized by the following pseudocode:

TABLE I

OPERATION OF SELECTION LOGIC

Initialize ACCUM = 0;
For every input byte do the following:
   1. If (ACCUM > N1) then SEL = 1, else SEL = 0;
   2. If SEL = 1 send byte to channel 2, else send
     byte to channel 1;
   3. If SEL = 1 then IN_ACCUM1 = −N1, else IN_ACCUM1 = N2;
   4. ACCUM = ACCUM + IN_ACCUM1.

Alternative algorithms may also be used, as will be apparent to those skilled in the art. For example, at step 1 in the table above, the condition tested may be whether ACCUM≧N1. Alternatively, ACCUM may be tested against some other integer value. In this case, the first cycle of the routine will give a different result, but otherwise logic 42 will function in substantially the same manner. Logic 42 is typically implemented using dedicated processing hardware, but it may alternatively be implemented in software running on a suitable programmable processor. The embodiments described below are likewise given to either hardware or software implementation.

Applying selection logic 42 to the case described in the Background of the Invention, in which N1:N2=200:201, will result in multiplexer 40 mapping the data bytes for output as follows:
   Forward one byte to channel 1
   Forward one byte to channel 2
   ... (repeat forwarding bytes in alternation, one byte to channel 1, and the next byte to channel 2, 199 times)
   ...
   Forward one byte to channel 2
   Forward one byte to channel 1
   Forward two bytes to channel 2
   Forward one byte to channel 1
   Forward one byte to channel 2
   Forward one byte to channel 1
   ...

It can be seen that the bytes are evenly spread between the two subchannels, so that any latency added by the multi-link transmission scheme used here should be no more than a few bytes. The bytes are fully interleaved between the two channels, so that even if a number of symbols are lost due to noise on one of the subchannels, error correction should still be possible using the intact data received on the other subchannel.

As an alternative, logic 42 and multiplexer 40 may be configured to map the data to channels 1 and 2 in other basic data quantities, such as words of two or three bytes each. Other word sizes and mappings of this sort will be apparent to those skilled in the art.

Figure 3:
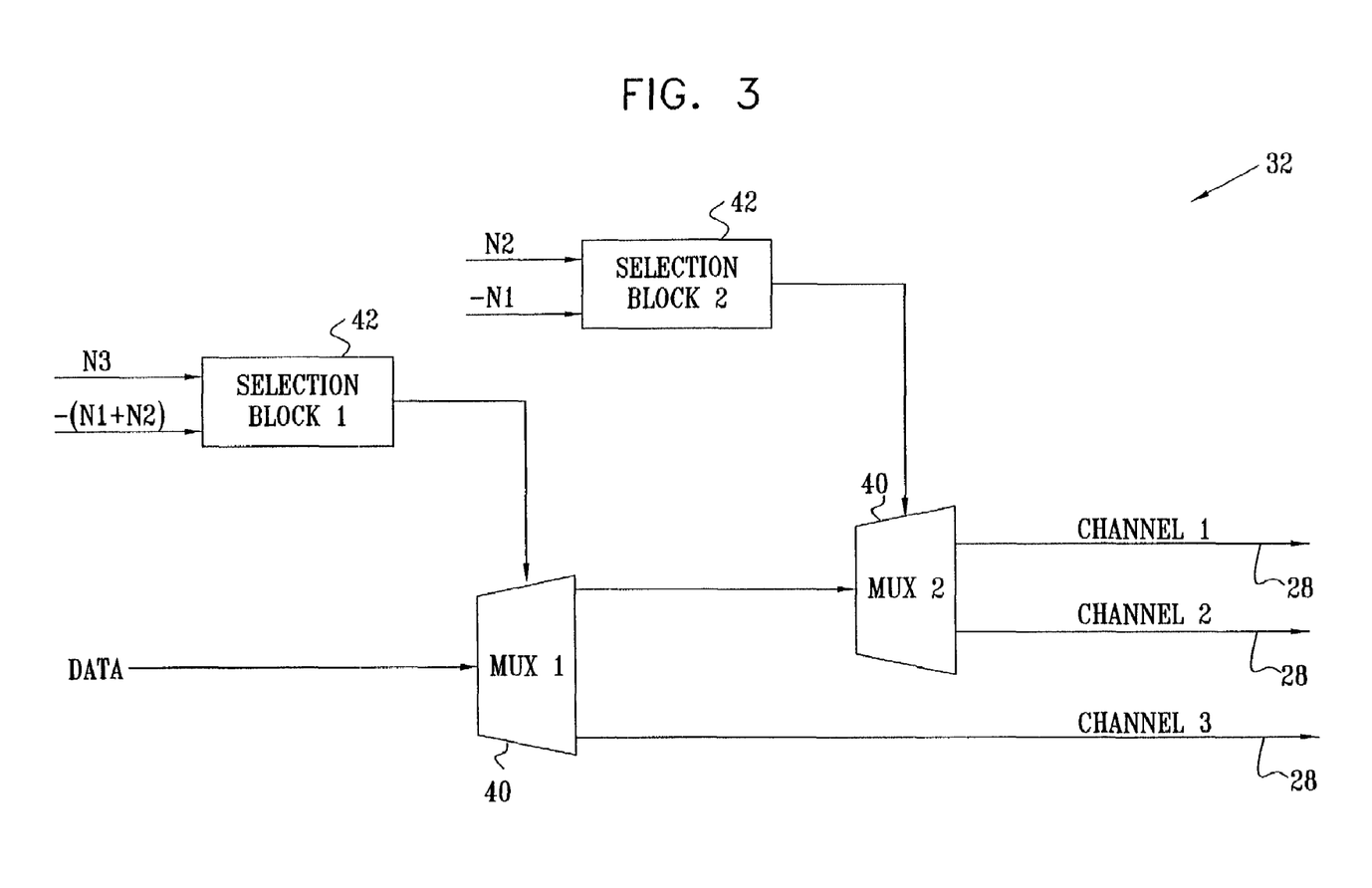
FIG. 3 is a block diagram that schematically illustrates a multiplexer used to partition data among three subchannels, in accordance with a preferred embodiment of the present invention.

FIG. 3 is a block diagram that schematically illustrates demultiplexer 32 in accordance with another preferred embodiment of the present invention, in which the principles of the preceding embodiment are extended to cover three subchannels 28. In this case, demultiplexer 32 comprises two selection blocks 42, preferably of the form shown in FIG. 2, controlling respective mapping multiplexers 40. In the first selection block, channel 1 and 2 are treated as a single subchannel, with rate N1+N2. The first mapping multiplexer thus distributes the incoming data bytes between channel 3 and the aggregated channels 1 and 2, depending on the ratio (N1+N2):N3. The second mapping multiplexer distributes the data bytes mapped to the aggregated channels between the individual channels 1 and 2. Extension of this structure to serve hierarchies with larger numbers of subchannels is straightforward.

Figure 4:
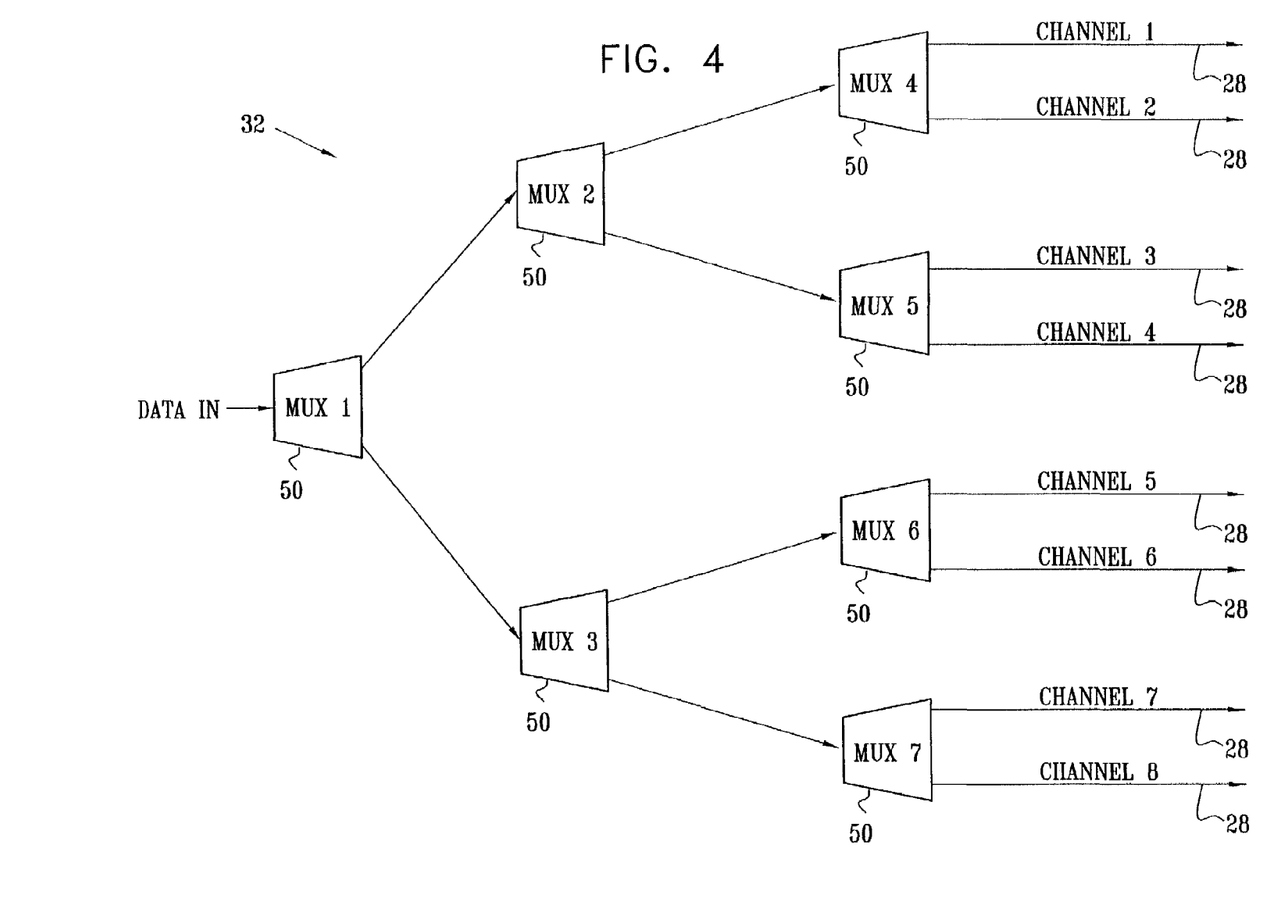
FIG. 4 is a block diagram that schematically illustrates a multiplexer used to partition data among multiple subchannels, in accordance with another preferred embodiment of the present invention.

FIG. 4 is a block diagram that schematically shows details of demultiplexer 32 in accordance with yet another preferred embodiment of the present invention. In this embodiment, demultiplexer 32 comprises a hierarchical tree of L stages, for partitioning data words among K subchannels, having respective data rates R[1], R[2], ..., R[K]. L is the smallest integer that is equal to or greater than $\log_2 K$, so that in the present case, with K=8, L=3. Demultiplexer 32 is made up of M−1 two-way splitters 50, wherein $M=2^L$, and K−1 of the splitters are non-degenerate. Thus, in the present example, there are seven splitters 50, labeled MUX 1 through MUX 7. (When M≠K, the remaining, degenerate splitters perform only fixed routing, with no splitting function.) The state of splitters 50 determines the subchannel to which each incoming data word is routed.

Preferably, the operation of splitters 50 is controlled based on pre-calculated arrays of switching parameters. The calculation is based on the respective rates R of the subchannels. Most preferably, in order to achieve good interleaving among the subchannels, the arrangement of the M−1 splitters with respect to the subchannels is made in such a way as to give a balanced tree in terms of data rates. In other words, each two-way splitter should be associated with two routes with similar aggregate rates. Three different exemplary methods of pre-calculation and data partitioning are described below. Alternative methods will be apparent to those skilled in the art.

EXAMPLE 1

In this case, the splitting is based on three (M−1)-entry arrays: A[i], C1[i] and C2[i]. A[i] is an accumulator identified with the ith two-way splitter 50, which is updated for each incoming data byte. C1[i] and C2[i] are constants used in incrementing and decrementing the ith accumulator. These constants are pre-calculated during system initialization, and should be updated any time there is a change in at least one subchannel rate. C1[i] and C2[i] are calculated as follows:

```
For i = M/2 to M−1
    C1[i] = R[2*i−M+1]
    C2[i] = R[2*i−M+2]
For i = M/2−1 to 1 (a decreasing index in steps of −1)
    C1[i] = C1[2*i] + C2[2*i]
    C2[i] = C1[2*i+1] + C2[2*i+1]
```

In these calculations, when K<M, the rates R[K+1] through R[M] are set to zero.

To begin operation of the multiplexer, all the accumulators A[i] are set to zero. The following calculation is then performed for every incoming data byte:

```
{
    k = 1
    For i=1 to L
    {
        If (A[k] ≧ C1[k])
        {
            A[k] = A[k] − C1[k]
            sel = 1
        }
        else
        {
            A[k] = A[k] + C2[k]
            sel = 0
        }
        k = k*2 + sel
    }
    Route the data byte to subchannel no. (k−M+1)
}
```

EXAMPLE 2

In this method, unlike the preceding one, accumulators A[i] are associated with respective subchannels 28, for i=1, ..., K, along with a single array of constant parameters C[i]. The parameters C[i] are pre-calculated during system initialization and are updated any time there is a change in at least one of the subchannel rates. In this example, each C[i] is simply set equal to G/R[i], wherein G is the least common multiple (LCM) of R1, R2, ... RK. Alternatively, other values of G may be used. As before, all the accumulators A[i] are set to zero before beginning operation. The following calculation is then performed for each incoming data byte:

```
{
    Find j such that A[j] = min(A[i]) over all i ≦ K
    A[j] = A[j] + C[j]
    Send data byte to subchannel no. j
}
```

Splitters 50 are set for each byte so as to select subchannel j, as provided by this calculation. If there is more than one value of j for which A[j]=min(A[i]), the lowest of these values of j may be selected. Alternatively, instead of finding min(A[i]) at each iteration, the data byte may be routed to the first subchannel found to have A[i] less than some predefined value.

As a further alternative, after all subchannel accumulators reach values greater than a predefined threshold, T, this threshold value is subtracted from all accumulators. In this case, for each incoming data byte, the following computation is performed:

```
{
    If all A[h] ≧ T (h=1, ... ,K)
        A[h] = A[h] − T, (h=1, ... ,K)
    Find, first j such that A[j] < T
    A[j] = A[j] + C[j]
    Send data byte to subchannel no. j
}
```

The methods of Example 2 are intuitively clear and are advantageously implemented in software. On the other hand, the method of Example 1 is a modular solution, which is generally easier to implement in hardware using the tree of splitters shown in FIG. 4.

EXAMPLE 3

This method is similar to that described in Example 2, but uses a scaling factor h to keep the accumulator values A[i] within a relatively small range. The parameters C[i] are pre-calculated as in Example 2. Preferably, h is the subchannel index such that C[h]=min(C[i]), taken over all i. Alternatively, h may be chosen to be a different subchannel index. The following calculation is performed for each incoming data byte:

```
{
    Find j such that A[j] = min(A[i]) over all i ≦ K
    If (j≠h)
        A[j] = A[j] + C[j]
    Else
        A[i] = A[i] − C[j] for all i except j
    End
    Send data byte to subchannel no. j
}
```

Figure 5:
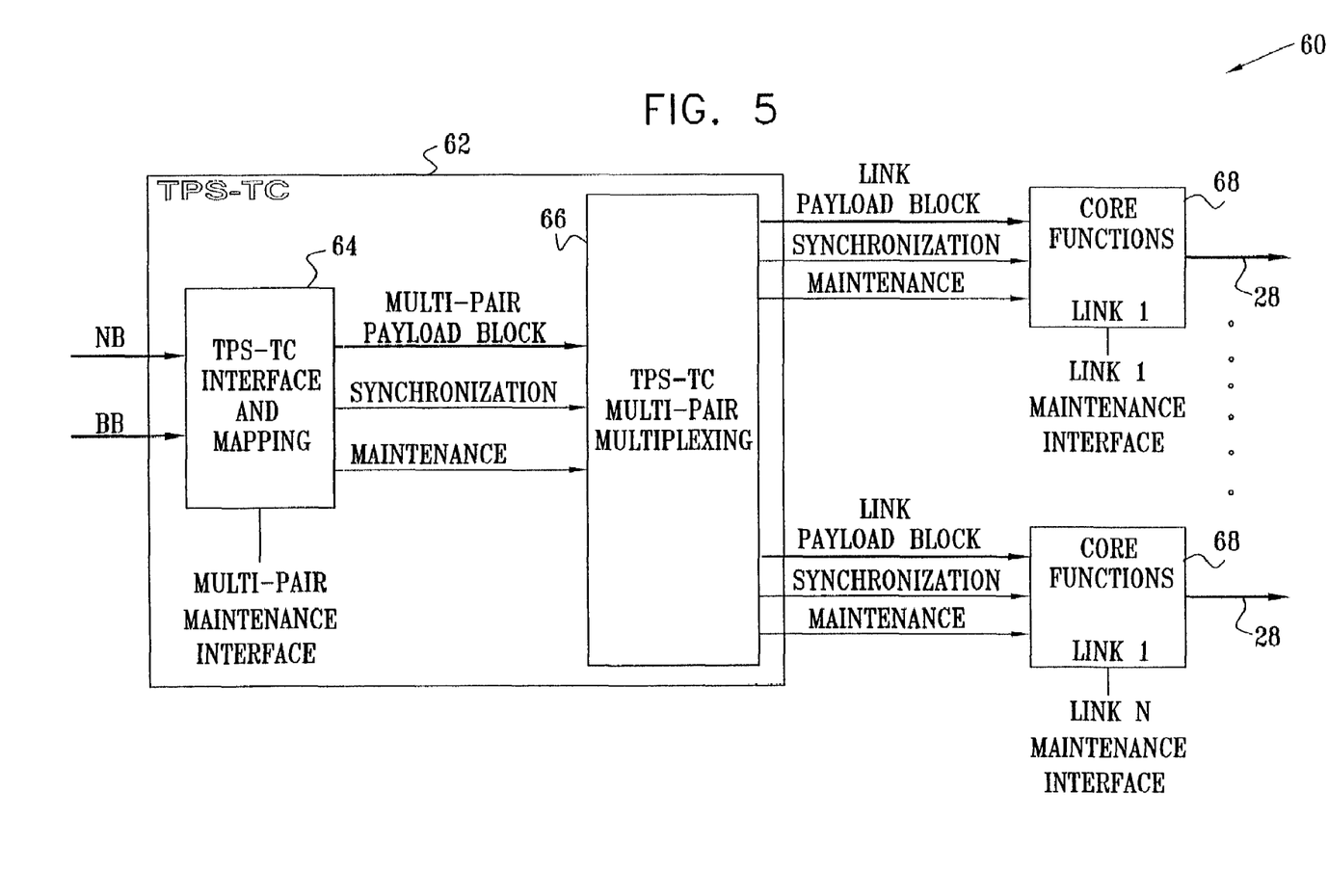
FIG. 5 is a block diagram that schematically illustrates a multi-pair data transmitter, in accordance with a preferred embodiment of the present invention.

FIG. 5 is a block diagram that schematically illustrates a multi-pair transmitter 60, in accordance with another preferred embodiment of the present invention. This model is similar to the standard SDSL transmitter reference configuration, as described in Chapter 4 (page 13) of the above-mentioned ETSI standard, except that it is extended to serve K subchannels 28. Typically, in SDSL configurations, as described in the Background of the Invention, each subchannel comprises a separate wire pair. The embodiment shown here may be used to implement the above-mentioned SDSL four-wire mode (in which case K=2), as well as extending this mode to higher values of K.

Transmitter 60 comprises a Transmission Protocol Specific—Transmission Convergence (TPS-TC) unit 62, which is similar to the TPC-TC block provided by the SDSL specification, except for the addition of byte-level multiplexing for multi-link support, as provided by the present invention. An interface and mapping sub-unit 64 interfaces to narrowband (NB) and broadband (BB) services, and performs data framing and other upper-level protocol functions, as are known in the art. Preferably, sub-unit 64 is configured for dual-bearer mapping, as defined by the SDSL standard, wherein each payload sub-block carried over a SDSL link is split between two separate communication streams with different rates. In other words, sub-unit 64 is configured to process data from different bearers, and to map the bytes of data from the different bearers into multi-pair payload blocks for transmission over channel 26. Dynamic rate repartitioning (DRR) can be used to reconfigure the data rate allocation between the different latency paths by modifying the multiplexing control parameters of sub-unit 64, without changing the total data rate carried by transmitter 60.

Interface and mapping sub-unit 64 passes the multi-pair payload blocks, as well as synchronization and maintenance signals, to a multi-pair multiplexing sub-unit 66. Sub-unit 66 maps each of these input multi-pair payload blocks into K separate link payload blocks, one for each of subchannels 28. The subchannel mapping is performed on a byte-by-byte basis, as described further hereinbelow. The multi-pair payload blocks generated by sub-unit 64, however, are essentially similar to conventional, single-pair payload blocks, so that the multiplexing function performed by sub-unit 66 is transparent to sub-unit 64. Therefore, the multi-pair multiplexing performed by sub-unit 66 is transparent to the TPS-TC interface, mapping and DRR functions of sub-unit 64.

Multiplexing sub-unit 66 outputs the appropriate link payload blocks, along with synchronization and maintenance signals, to K core function units 68, one for each subchannel 28. Preferably, any Z-bits (which are used, according to the SDSL standard, for service, signaling and maintenance) in the multi-pair payload blocks are duplicated to all the links. Units 68 serve as physical layer interfaces to the respective subchannels. They perform Physical Medium Specific (PMS) and Physical Medium Dependent (PMD) functions for their respective subchannels, as provided by the SDSL specification.

Figure 6:
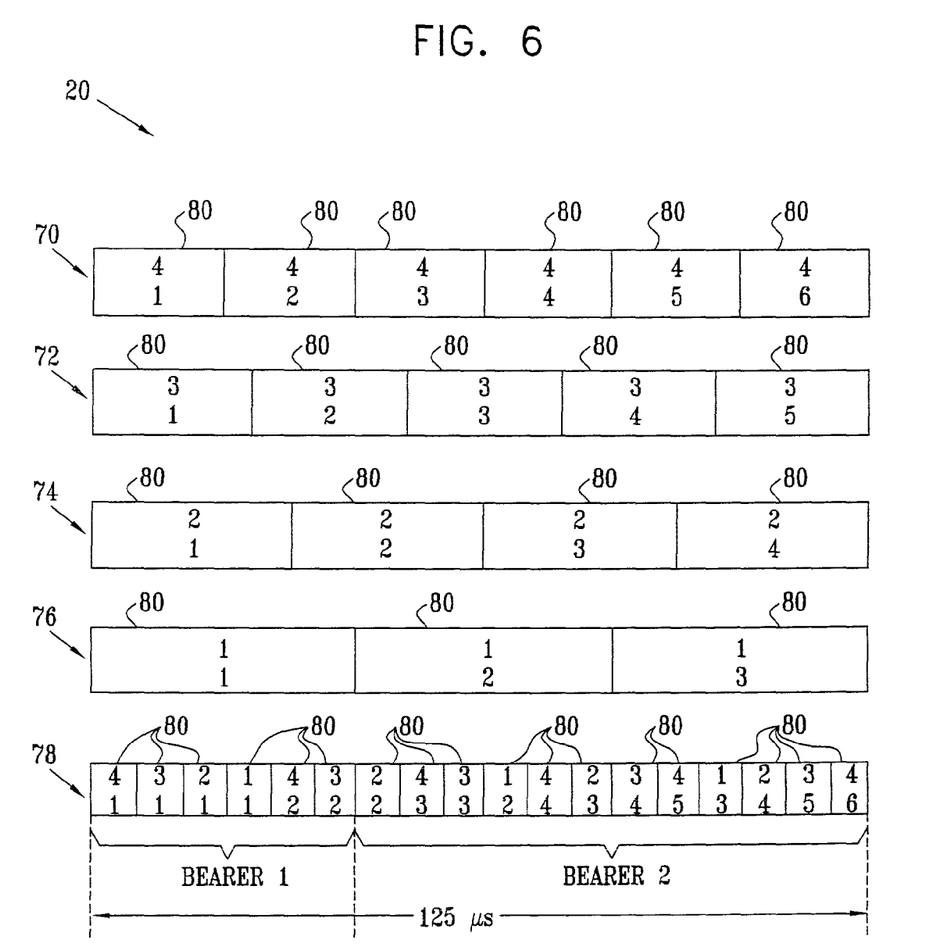
FIG. 6 is a timing diagram that schematically illustrates multiplexing of data words among multiple subchannels, in accordance with a preferred embodiment of the present invention.

FIG. 6 is a block diagram that schematically illustrates multiplexing of bytes 80 from four SDSL subchannel links 70, 72, 74 and 76 into a multi-link payload block 78, in accordance with a preferred embodiment of the present invention. Each byte is labeled with two indices: an upper index representing the subchannel (numbered 1 through 4) over which the byte is to be carried, and a lower index counting the bytes on each subchannel. In the present example, the links are assumed to have respective payload rates of 192, 256, 320, and 384 kbps. Within the 125 μs duration of the multi-link block, these rates correspond respectively to three, four, five, and six bytes per link payload block. More generally, based on standard SDSL link rates, the number of time slots $n_i$ used on subchannel i for each multi-link payload block can take on any value in the range of three to thirty-six, depending on channel conditions.

Multiplexing sub-unit 66 maps the bytes in the multi-pair payload block to the individual link payload blocks according to a "first available link" criterion, in order to achieve minimum latency. The bytes that are mapped to each of the link payload blocks are approximately evenly spread over the multi-pair payload block, in order to provide good interleaving. The mapping of successive bytes to the different subchannels may be determined on the fly, using logic such as that shown in the preceding figures, for example. Alternatively, the mapping for given combinations of subchannel rates may be precalculated and stored in a table, for example, and then applied to each of the bytes in sequence. In either case, the interleaving order of the bytes is fully determined by the subchannel rates. It is therefore sufficient for the transmitter to pass the rates and identification numbers of the subchannels to the receiver, and there is no need for exchange of interleaving tables. As indicated at the bottom of the figure, data from two different bearers (bearer 1 and bearer 2) with different, respective bandwidths have been mapped together into multi-link payload block 78 by sub-block 64. Of the eighteen bytes in block 78, the first six are allocated to bearer 1, and the remainder to bearer 2.

The order of multiplexing bytes 80 among subchannels 70, 72, 74 and 76 is preferably determined exactly from the payload rates, as shown in FIG. 6, in order to ensure optimal use of available link bandwidth. Any of the methods described above can be used for this purpose. Alternatively, the algorithm described in pseudocode in Table II below may be used:

TABLE II

For all multi-pair payload bytes
  For i = 1:K // all links
    A[i] = A[i] + p;
    if (A[i] ≧ q[i])) {
      A[i] = A[i] − q[i];
      next byte is mapped to link i
    }

Here A[i] are accumulators, as above, one per subchannel, which are first set to zero. Then, for each iteration, the accumulators are incremented by a value p, and the result is mapped to the range [0, q−1] by a modulo operation. Initial values of p and q[i] can be defined as max(n[i]) and floor(Σn[i]*p/n[i]), respectively, wherein n[i] is the number of time slots used on subchannel i for each multi-link payload block, as noted above. The function "floor" means the greatest integer that is less than or equal to its argument. Using four subchannels, with $n_1$=3, $n_2$=4, $n_3$=4, and $n_4$=5, as described above, the algorithm in Table II generates the mapping shown in FIG. 6.

Preferably, transmitter 60 is configured so that the number K of subchannels 28 over which it multiplexes the data stream, as well as the individual rates of the subchannels, may change from time to time. Referring back to FIG. 5, it is seen that TPS-TC unit 62 and core function units 68 have maintenance interfaces and, as noted above, exchange maintenance signals. Preferably, startup and maintenance protocols used by transmitter 60 and its associated receiver (as shown in FIG. 1) exploit the embedded operations channel (eoc) defined by the SDSL specification for their startup and maintenance protocols. These protocols are used in defining the subchannels and multiplexing ratios, based on the subchannel rates at system startup. In addition, if a link is added, deleted, fails or changes its rate during operation, the maintenance protocol is preferably used to update the multiplexing scheme accordingly. These functions can be integrated with a DRR protocol, by adding the new data rates of the subchannels to the DRR messages.

Although preferred embodiments are described herein with reference to particular VDSL and SDSL standards, the principles of the present invention may similarly be extended to other varieties of DSL links, as well as to digital communication systems of other types. Furthermore, although these preferred embodiments are drawn to devices that map successive words to different subchannels on a word-by-word basis, the methods described above may also be used simply for calculating the distribution of words in a data block of fixed size among a number of different subchannels with different rates. This distribution of the words, in proportion to the relative rates of the subchannels, provides efficient use of subchannel resources even if the words are not interleaved evenly among the subchannels. Such methods for efficient multiplexing of data blocks among three or more subchannels are not taught by the prior art.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for transmitting a stream of data over a channel made up of a plurality of subchannels having respective subchannel rates, the method comprising:

partitioning the data among the subchannels, such that responsive to the respective subchannel rates, successive words of the data, including at least first, second and third words in succession, are mapped to the subchannels in alternation, whereby the first word is mapped to a first subchannel, the second word is mapped to a second subchannel, and the third word is mapped to one of the first subchannel and a third subchannel;

transmitting the words of the data over the subchannels to which they are mapped; and receiving and processing the words from the subchannels to recover the stream of data, wherein partitioning the data comprises deciding, for each word among the successive words, to which of the subchannels the word should be mapped, and wherein deciding to which of the subchannels the word should be mapped comprises assigning respective numbers of the words to the subchannels so that at any point in time while transmitting the words of the data over the subchannels, a ratio of the numbers of the words that have been assigned to each of a given pair of the subchannels is approximately equal to the ratio of the respective subchannel rates.

2. A method according to claim 1, wherein partitioning the data comprises mapping bytes of the data in alternation to the subchannels.

3. A method according to claim 1, wherein the stream of data is divided into a sequence of data blocks, each such block comprising a number of the words and having a block size defined by the number of the words therein, and wherein partitioning the data comprises mapping the successive words to the subchannels in a manner substantially independent of the block size.

4. A method according to claim 3, wherein the data blocks belong to one of a group of block types consisting of data frames, packets and cells.

5. A method according to claim 3, and comprising framing the blocks in accordance with a data framing protocol applicable to the channel prior to mapping the successive words to the subchannels, and wherein processing the words comprises reassembling the blocks.

6. A method according to claim 5, wherein framing the blocks comprises, for each block among at least some of the blocks, combining the data from multiple bearers in a payload of the block, and wherein mapping the successive words comprises mapping the words to the subchannels in a manner substantially independent of a partitioning of the payload among the multiple bearers.

7. A method according to claim 6, wherein combining the data comprises altering the partitioning of the payload of the blocks, without affecting the partitioning of the data among the subchannels.

8. A method according to claim 1, wherein the plurality of subchannels comprise a plurality of different frequency bands carried on a common physical channel.

9. A method according to claim 1, wherein each of the plurality of subchannels comprises a separate group of one or more wires.

10. A method according to claim 1, wherein partitioning the data comprises changing, responsive to a change in one or more of the subchannels while transmitting the words of the data, the partitioning among the subchannels.

11. A method according to claim 1, wherein deciding to which of the subchannels the word should be mapped comprises assigning the words to the subchannels in an order such that the words that are mapped to each of the subchannels are distributed approximately evenly with respect to the stream of data.

12. A method according to claim 1, wherein deciding to which of the subchannels the word should be mapped comprises computing in advance a table of assignment of the successive words to the subchannels, and wherein partitioning the data comprises mapping the words to the subchannels responsive to the table.

13. A method according to claim 1, wherein transmitting the words of the data comprises transmitting the data over a Digital Subscribe Line (DSL) connection.

14. A method for transmitting a stream of data over a channel made up of a plurality of subchannels having respective subchannel rates, the method comprising:

partitioning the data among the subchannels, such that responsive to the respective subchannel rates, successive words of the data, including at least first, second and third words in succession, are mapped to the subchannels in alternation, whereby the first word is mapped to a first subchannel, the second word is mapped to a second subchannel, and the third word is mapped to one of the first subchannel and a third subchannel;

transmitting the words of the data over the subchannels to which they are mapped; and receiving and processing the words from the subchannels to recover the stream of data, wherein partitioning the data comprises deciding, for each word among the successive words, to which of the subchannels the word should be mapped, and wherein deciding to which of the subchannels the word should be mapped comprises interleaving the words among the subchannels in an order that is fully determined by the subchannel rates.

15. A method according to claim 14, wherein receiving and processing the words comprises determining, dependent upon the rates, an order in which to reassemble the words so as to recover the stream of data.

16. A method for transmitting a stream of data over a channel made up of a plurality of subchannels having respective subchannel rates, the method comprising:
partitioning the data among the subchannels, such that responsive to the respective subchannel rates, successive words of the data, including at least first, second and third words in succession, are mapped to the subchannels in alternation, whereby the first word is mapped to a first subchannel, the second word is mapped to a second subchannel, and the third word is mapped to one of the first subchannel and a third subchannel;
transmitting the words of the data over the subchannels to which they are mapped; and
receiving and processing the words from the subchannels to recover the stream of data,
wherein partitioning the data comprises deciding, for each word among the successive words, to which of the subchannels the word should be mapped, and
wherein deciding to which of the subchannels the word should be mapped comprises selecting one of the subchannels responsive to an accumulated value indicative of a distribution of the words among the subchannels, and updating the accumulated value responsive to the selected subchannel for use in deciding to which of the subchannels subsequent words should be mapped.

17. A method according to claim 16, wherein selecting one of the subchannels comprises assigning a respective subchannel value to each of the subchannels in proportion to the respective subchannel rates, and wherein updating the accumulated value comprises changing the accumulated value responsive to the subchannel value assigned to the selected subchannel.

18. A method according to claim 16, wherein updating the accumulated value comprises computing respective accumulated values for all the subchannels, responsive to the subchannel rates and to respective numbers of the words mapped to the subchannels, and wherein selecting one of the subchannels comprises selecting the one of the subchannels whose respective accumulated value satisfies a predetermined criterion.

19. A method according to claim 16, wherein the plurality of subchannels comprises three or more subchannels, and wherein deciding to which of the subchannels the word should be mapped comprises:
grouping at least two of the subchannels together in a subchannel group;
routing a subset of the words of the data to the subchannel group; and
splitting the subset of the words among the subchannels in the subchannel group.

20. A method according to claim 19, wherein grouping at least two of the subchannels comprises assigning the subchannels in multiple subchannel groups, and providing a hierarchy of splitters for dividing the words among the groups, wherein routing and splitting the subset of the words comprises controlling the splitters so as to route and split the subset of the words.

21. A method for transmitting a stream of data over a channel made up of a plurality of subchannels, the method comprising:
framing the data in a sequence of data blocks in accordance with a data framing protocol;
partitioning the data in each of the blocks among the subchannels, such that successive words of the data, including at least first, second and third words in succession, are mapped to the subchannels in alternation, whereby the first word is mapped to a first subchannel, the second word is mapped to a second subchannel, and the third word is mapped to one of the first subchannel and a third subchannel, in a manner substantially independent of the framing of the data blocks;
transmitting the words of the data over the subchannels to which they are mapped; and
receiving and processing the words from the subchannels so as to reassemble the data blocks,
wherein framing the data comprises framing the blocks in accordance with a data framing protocol applicable to the channel, and
wherein framing the blocks comprises, for each block among at least some of the blocks, combining the data from multiple bearers in a payload of the block, and wherein mapping the successive words comprises mapping the words to the subchannels in a manner substantially independent of a partitioning of the payload among the multiple bearers.

22. A method according to claim 21, wherein the data blocks belong to one of a group of block types consisting of data frames, packets and cells.

23. A method according to claim 21, wherein combining the data comprises altering the partitioning of the payload of the blocks, substantially without affecting the partitioning of the data among the subchannels.

24. Apparatus for transmitting a stream of data over a channel made up of a plurality of subchannels having respective subchannel rates, the apparatus comprising:
a subchannel demultiplexer, which is to partition the data among the subchannels by mapping, responsive to the respective subchannel rates, successive words of the data, including at least first, second and third words in succession, to the subchannels in alternation, whereby the first word is mapped to a first subchannel, the second word is mapped to a second subchannel, and the third word is mapped to one of the first subchannel and a third subchannel; and
one or more physical layer interfaces, coupled to transmit the words of the data over the subchannels to which they are mapped, whereby a receiver is able to receive and process the words from the subchannels to recover the stream of data,
wherein the subchannel demultiplexer is to partition the data by deciding, for each word among the successive words, to which of the subchannels the word should be mapped, and
wherein the subchannel demultiplexer is to assign respective numbers of the words to the subchannels so that at any point in time while transmitting the words of the data over the subchannels, a ratio of the numbers of the words that have been assigned to each of a given pair of the subchannels is approximately equal to the ratio of the respective subchannel rates.

25. Apparatus according to claim 24, wherein the subchannel demultiplexer is to map bytes of the data in alternation to the subchannels.

26. Apparatus according to claim 24, wherein the stream of data is divided into a sequence of data blocks, each such block comprising a number of the words and having a block size defined by the number of the words therein, and wherein the subchannel demultiplexer is to map the successive words to the subchannels in a manner substantially independent of the block size.

27. Apparatus according to claim 26, wherein the data blocks belong to one of a group of block types consisting of data frames, packets and cells.

28. Apparatus according to claim 26, and comprising a protocol processor, which is to frame the blocks in accordance with a data framing protocol applicable to the channel, prior to mapping the successive words to the subchannels by the subchannel demultiplexer.

29. Apparatus according to claim 28, wherein the protocol processor is, for each block among at least some of the blocks, to combine the data from multiple bearers in a payload of the block, and wherein the subchannel demultiplexer is to map the words to the subchannels in a manner substantially independent of a partitioning of the payload among the multiple bearers.

30. Apparatus according to claim 29, wherein the protocol processor is to alter the partitioning of the payload of the blocks, without affecting the partitioning of the data among the subchannels by the subchannel demultiplexer.

31. Apparatus according to claim 24, wherein the plurality of subchannels comprise a plurality of different frequency bands carried on a common physical channel.

32. Apparatus according to claim 24, wherein each of the plurality of subchannels comprises a separate group of one or more wires, and wherein the one or more physical layer interfaces comprise a plurality of physical layer interfaces, respectively coupled to the plurality of subchannels.

33. Apparatus according to claim 24, wherein the subchannel demultiplexer is to change, responsive to a change in one or more of the subchannels while transmitting the words of the data, the partitioning of the data among the subchannels.

34. Apparatus according to claim 24, wherein the subchannel demultiplexer is to assign the words to the subchannels in an order such that the words that are mapped to each of the subchannels are distributed approximately evenly with respect to the stream of data.

35. Apparatus according to claim 24, wherein the subchannel demultiplexer is to map the words to the subchannels responsive to a pre-computed table of assignment of the successive words to the subchannels.

36. Apparatus according to claim 24, wherein the channel comprises a Digital Subscribe Line (DSL) connection.

37. Apparatus for transmitting a stream of data over a channel made up of a plurality of subchannels having respective subchannel rates, the apparatus comprising:

a subchannel demultiplexer, which is to partition the data among the subchannels by mapping, responsive to the respective subchannel rates, successive words of the data, including at least first, second and third words in succession, to the subchannels in alternation, whereby the first word is mapped to a first subchannel, the second word is mapped to a second subchannel, and the third word is mapped to one of the first subchannel and a third subchannel; and one or more physical layer interfaces, coupled to transmit the words of the data over the subchannels to which they are mapped, whereby a receiver is able to receive and process the words from the subchannels to recover the stream of data, wherein the subchannel demultiplexer is to partition the data by deciding, for each word among the successive words, to which of the subchannels the word should be mapped, and wherein the subchannel demultiplexer is to interleave the words among the subchannels in an order that is fully determined by the subchannel rates, whereby the receiver is able to determine, dependent upon the rates, an order in which to reassemble the words so as to recover the stream of data.

38. Apparatus for transmitting a stream of data over a channel made up of a plurality of subchannels having respective subchannel rates, the apparatus comprising:

a subchannel demultiplexer, which is to partition the data among the subchannels by mapping, responsive to the respective subchannel rates, successive words of the data, including at least first, second and third words in succession, to the subchannels in alternation, whereby the first word is mapped to a first subchannel, the second word is mapped to a second subchannel, and the third word is mapped to one of the first subchannel and a third subchannel; and one or more physical layer interfaces, coupled to transmit the words of the data over the subchannels to which they are mapped, whereby a receiver is able to receive and process the words from the subchannels to recover the stream of data, wherein the subchannel demultiplexer is to partition the data by deciding, for each word among the successive words, to which of the subchannels the word should be mapped, and wherein the subchannel demultiplexer is to select one of the subchannels to which the word should be mapped responsive to an accumulated value indicative of a distribution of the words among the subchannels, and to update the accumulated value responsive to the selected subchannel for use in deciding to which of the subchannels subsequent words should be mapped.

39. Apparatus according to claim 38, wherein the subchannel demultiplexer is to assign a respective subchannel value to each of the subchannels in proportion to the respective subchannel rates, and to update the accumulated value responsive to the subchannel value assigned to the selected subchannel.

40. Apparatus according to claim 38, wherein the subchannel demultiplexer is to compute respective accumulated values for all the subchannels, responsive to the subchannel rates and to respective numbers of the words mapped to the subchannels, and to select the one of the subchannels whose respective accumulated value satisfies a predetermined criterion.

41. Apparatus according to claim 38, wherein the plurality of subchannels comprises three or more subchannels, and wherein the subchannel demultiplexer is to decide to which of the subchannels the word should be mapped by grouping at least two of the subchannels together in a subchannel group, routing a subset of the words of the data to the subchannel group, and splitting the subset of the words among the subchannels in the subchannel group.

42. Apparatus according to claim 41, wherein the subchannel demultiplexer comprises a hierarchy of splitters arranged so as to group the subchannels in multiple subchannel groups, and is to control the splitters so as to route and split the words among the multiple groups.

43. Apparatus for transmitting a stream of data over a channel made up of a plurality of subchannels, the method comprising:

a protocol processor, which is to frame the data in a sequence of data blocks;

a subchannel demultiplexer, which is to partition the data among the subchannels by mapping successive words of the data, including at least first, second and third words in succession, to the subchannels in alternation, whereby the first word is mapped to a first subchannel, the second word is mapped to a second subchannel, and the third word is mapped to one of the first subchannel and a third subchannel, substantially independently of the framing of the data blocks by the protocol processor;

one or more physical layer interfaces, coupled to transmit the words of the data over the subchannels to which they are mapped, whereby a receiver is able to receive and process the words from the subchannels so as to reassemble the data blocks, wherein the protocol processor is to frame the blocks in accordance with a data framing protocol applicable to the channel, and wherein the protocol processor is, for each block among at least some of the blocks, to combine the data from multiple bearers in a payload of the block, and wherein the subchannel demultiplexer is to map the successive words to the subchannels in a manner substantially independent of a partitioning of the payload among the multiple bearers.

44. Apparatus according to claim 43, wherein the data blocks belong to one of a group of block types consisting of data frames, packets and cells.

45. Apparatus according to claim 43, wherein the protocol processor is to alter the partitioning of the payload of the blocks, substantially without affecting the partitioning of the data among the subchannels.

* * * * *